Patented June 23, 1953

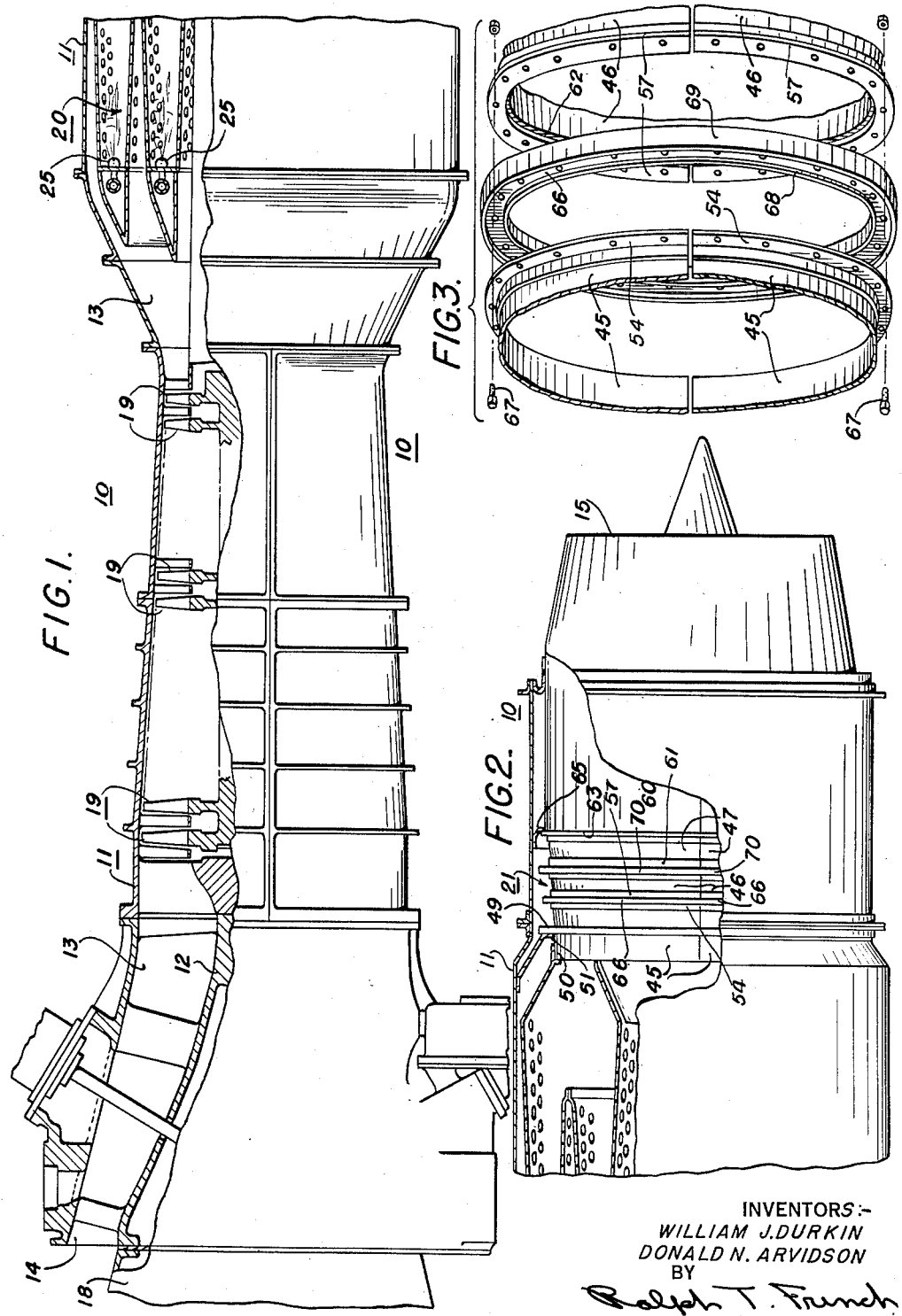

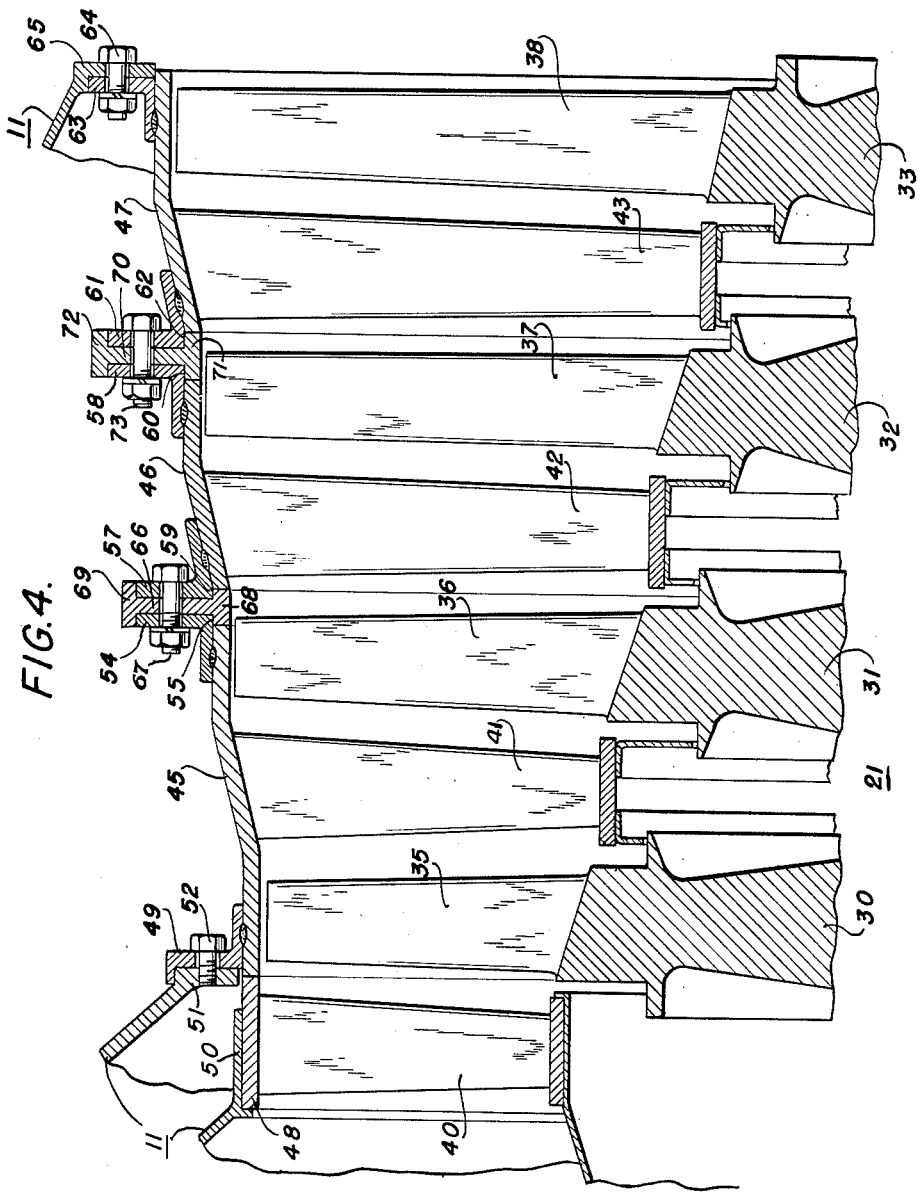

2,643,085

UNITED STATES PATENT OFFICE 2,643,085

GAS TURBINE APPARATUS

William J. Durkin, Swarthmore, and Donald N. Arvidson, Prospect Park, Pa., assignors to Westinghouse Electric Corporation, East Pittsburgh, Pa., a corporation of Pennsylvania Application September 8, 1948, Serial No. 48,168

1 Claim. (Cl. 253—69)

This invention relates to turbines, particularly to a turbine and diaphragm structure for a gas turbine power plant, and has for an object the provision of improved apparatus of the class described.

In the construction of certain classes of aircraft gas turbine engines, such as the type including compressor and turbine rotors mounted on a common shaft adjacent the respective inlet and outlet portions of a combustion chamber surrounding the shaft, it is desirable to provide an assembly enabling the installation of the turbine rotor as a preassembled unit. The handling of the turbine rotor as a unit is particularly desirable when a multiple stage turbine is to be employed, since precision construction and balancing of the associated discs and blades are necessary for production of efficiently operative engine. To facilitate construction of such a power plant, it has been proposed to provide a split diaphragm structure comprising separate halves or sections which can readily be bolted at opposite sides of the unitary turbine rotor, for supporting the usual stationary guide vanes in alignment with the rotor turbine vanes. In actual practice, however, a considerable problem has been encountered in connection with the tendency of such a diaphragm structure, comprising the separate sections just described, to become distorted or displaced when heated to the normal operating temperatures developed in a gas turbine.

It is, therefore, another object of the present invention to provide an improved turbine assembly embodying features of construction that will be effective to prevent distortion of the sections of a split diaphragm structure.

A feature of the invention is the provision of an improved annular diaphragm structure for a turbine comprising a plurality of abutting arcuate segments carrying the stationary turbine blades, and mounted in an overlapping integral ring member which is adapted to resist distortion or displacement of the segments when subjected to heat of operation developed in the turbine.

Another object of the invention is the provision of an improved diaphragm structure including semi-circular vane carrying shroud sections supported by integral rings of flanged or I-shaped cross-section, each ring being interposed between and bolted to the adjacent pairs of shroud sections to prevent distortion or displacement of the assembled members of the diaphragm structure.

These and other objects are effected by our invention as will be apparent from the following description and claim taken in connection with the accompanying drawings, forming a part of this application, in which:

Fig. 1 is a diagrammatic elevational view, partly in section, of the forward portion of a typical gas turbine power plant;

Fig. 2 is a similar view of the rear portion thereof having a turbine constructed in accordance with the invention;

Fig. 3 is a fragmentary "exploded" view illustrating the assembly of the improved turbine diaphragm structure; and Fig. 4 is a fragmentary, enlarged-detail sectional view of the turbine shown in Fig. 2.

The forward and rear sections of a typical aviation gas turbine power plant 10 are illustrated diagrammatically in Figs. 1 and 2, respectively, which may be considered together for an understanding of the main features of construction of the apparatus. The gas turbine engine as shown in these figures comprises an outer casing structure 11, which may be made up of a number of cylindrical sections and which has suitably mounted therein an inner sectional core structure 12 cooperating with the outer casing structure to form an annular flow passageway 13, which extends longitudinally through the engine from a forwardly directed intake opening 14 to a rearwardly disposed discharge nozzle 15. Although any suitable gas turbine power plant might be equipped with a turbine construction embodying features of the present invention, the power plant shown in the illustration is of the type adapted for operation of a propeller (not shown). It will be understood that the gas turbine engine 10 is adapted to be mounted in or on the fuselage or wing of an aircraft, with the inlet opening 14 pointed forwardly. Operating elements of the gas turbine engine are arranged in axial alignment in order to minimize the frontal area presented by the engine, and comprise suitable propeller drive reduction gearing (not shown) mounted in a casing section 18, an axial flow compressor 19, annular combustion apparatus 20, and a multiple stage turbine 21, the rotor of which is operatively connected to the compressor rotor and to the reduction gearing through the medium of a suitable axially-disposed shaft (not shown) extending through the combustion apparatus.

In accordance with well known principles of operation of gas turbine power plants, air entering the annular intake opening 14 passes through the passage 13 to the compressor 19, which delivers the air under pressure to the combustion apparatus 20 for supporting combustion of fuel, which may be admitted by way of suitable nozzles 25. Heated motive fluid thus generated in the combustion apparatus 20 is then expanded through the turbine 21 for driving the compressor and propeller while the exhausted motive fluid is discharged to the atmosphere by way of the nozzle 15, usually in the form of a jet establishing a propulsive thrust augmenting that of the propeller.

Referring now to Fig. 4 of the drawings, the multiple stage turbine 21 has a rotor comprising a plurality of assembled discs 30, 31, 32 and 33, which are suitably secured together and constitute a part of the rotor aggregate of the engine. The respective discs have mounted thereon sets of radial blades 35, 36, 37 and 38, which constitute the stages of the turbine, the blades varying in length from the high-pressure blades 35 to the relatively long low-pressure blades 38. An annular turbine nozzle structure having stationary radial blades 40 is mounted in advance of the first stage of rotary blades 35. Stationary radial guide blades 41, 42 and 43 are interposed between the turbine blades 35, 36, 37 and 38 carried by the discs and, according to the invention, are held in place by an improved diaphragm structure which is adapted to ensure maximum rigidity and resistance to distortion without imposing excessive weight on the other parts of the engine.

The improved diaphragm structure as shown in Fig. 4 comprises a plurality of arcuate or semi-circular shroud sections to which the stationary guide blades are secured, including a pair of shroud sections 45 carrying the blades 41, a pair of shroud sections 46 carrying blades 42, and a pair of shroud sections 47 carrying blades 43. Each of the pair of semi-circular shroud sections 45 includes an end portion abutting a shroud section 48 carrying the nozzle blades 40, and has welded thereto a radial flange 49. The shroud section 48 and flange 49 are secured, respectively, to suitable annular flanges 50 and 51 carried by the casing structure 11 of the engine. The flanges 49 and 51 are suitably apertured to receive bolts 52 for securing the flanges together.

Welded on the opposite end of each shroud section 45 is a radially projecting marginal flange 54, a portion of which projects slightly beyond the section forming a shoulder or spigot 55. Marginal flanges 57 and 58 are likewise welded on the ends of the semi-circular shroud sections 46, forming spigots 59 and 60, respectively. The shroud sections 47 are each provided with a radially projecting flange 61 forming a spigot 62, and carry mounting flanges 63 which are apertured and adapted to be secured by bolts 64 to an annular portion 65 of the casing structure.

For rendering the diaphragm assembly rigid and resistant to distortion when heated to normal operating temperatures, an integral ring or annular frame member 66 having substantially an I-shaped cross-section is interposed between the flanges 54 and 57 and secured thereto by bolts 67 inserted in registering openings in the said members. The ring 66 has formed thereon an inner flange portion 68 engageable with the spigots 55 and 59, and an outer flange portion 69 which overlaps the respective flanges 54 and 57. A similar ring 70 having inner and outer flange portions 71 and 72 is secured between the flanges 58 and 61 by means of bolts 73, with the flange portion 71 bearing against the spigots 60 and 62, and with the flange portion 72 encompassing the outer edges of the flanges 58 and 61. In Fig. 3, the integral ring 66 and portions of the associated pairs of semi-circular shroud sections 45 are shown in schematic or "exploded" form to illustrate the principle of the assemblage of elements of which the improved diaphragm is constructed. If desired, the split or semi-circular diaphragm sections 46 may be joined along a plane at an angle with respect to that of the junction of sections 45, to distribute uniformly the stresses on ring 66.

It will be apparent that with the apparatus assembled as shown in Fig. 4, the flanged semi-circular shroud sections 45, 46 and 47 are interlocked with the I-shaped integral rings 66 and 70 to provide a sturdy and rigid diaphragm structure, which is adapted to permit desirably close operating clearances for the rotary blades of the turbine without risk due to excessive distortion at high temperatures, thus contributing to the attainment of improved and efficient operational characteristics for the power plant. The features of the invention may readily be incorporated in a gas turbine apparatus without increasing weight or overall dimensions thereof, and will be particularly useful in aircraft apparatus in which ease of assembly and maintenance are important.

While the invention has been shown in but one form, it will be obvious to those skilled in the art that it is not so limited, but is susceptible of various changes and modifications without departing from the spirit thereof.

What is claimed is:

A turbine diaphragm structure comprising a plurality of pairs of semi-circular shroud sections carrying radial blades, said shroud sections having marginal flanges and spigots formed thereon, and integral supporting rings interposed between and secured to the respective pairs of shroud sections, said rings being of I-shaped cross section with concentric inner and outer flanges engaging the flanges and spigots of said shroud sections for preventing distortion of the assembled diaphragm structure.

WILLIAM J. DURKIN.
DONALD N. ARVIDSON.

References Cited in the file of this patent

UNITED STATES PATENTS

| Number | Name | Date |
|---|---|---|
| 1,288,360 | Zaar | Dec. 17, 1918 |
| 1,369,668 | Junggren | Feb. 22, 1921 |
| 2,397,815 | Smith | Apr. 2, 1946 |
| 2,425,177 | Cronstedt | Aug. 5, 1947 |
| 2,445,661 | Constant | July 20, 1948 |
| 2,488,867 | Judson | Nov. 22, 1949 |